July 27, 1943.  R. H. HELSEL  2,325,054
TICKET ISSUING MACHINE
Filed Jan. 7, 1941  5 Sheets-Sheet 1

WITNESS:

INVENTOR
Reuben H. Helsel
BY
Busser & Harding
ATTORNEYS.

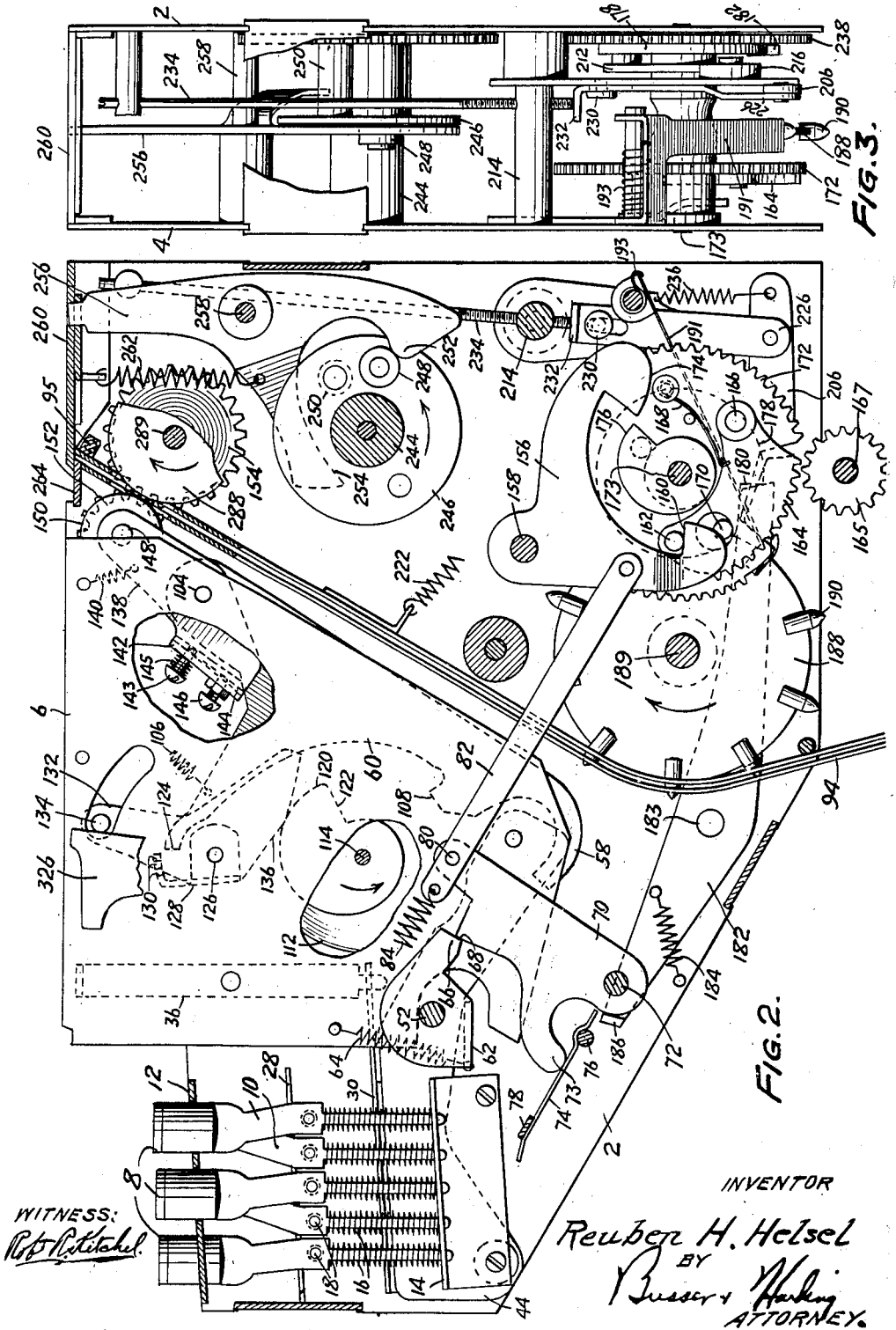

July 27, 1943.  R. H. HELSEL  2,325,054
TICKET ISSUING MACHINE
Filed Jan. 7, 1941  5 Sheets-Sheet 3

INVENTOR
Reuben H. Helsel
BY
Bussert Harding
ATTORNEYS

WITNESS:

July 27, 1943.  R. H. HELSEL  2,325,054
TICKET ISSUING MACHINE
Filed Jan. 7, 1941   5 Sheets-Sheet 4

WITNESS:

INVENTOR
Reuben H. Helsel
BY
ATTORNEYS.

July 27, 1943.　　　R. H. HELSEL　　　2,325,054
TICKET ISSUING MACHINE
Filed Jan. 7, 1941　　　5 Sheets-Sheet 5
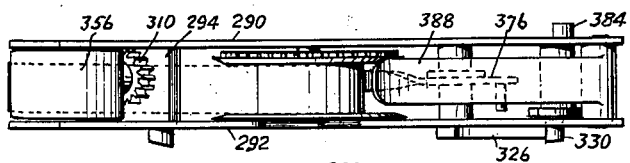
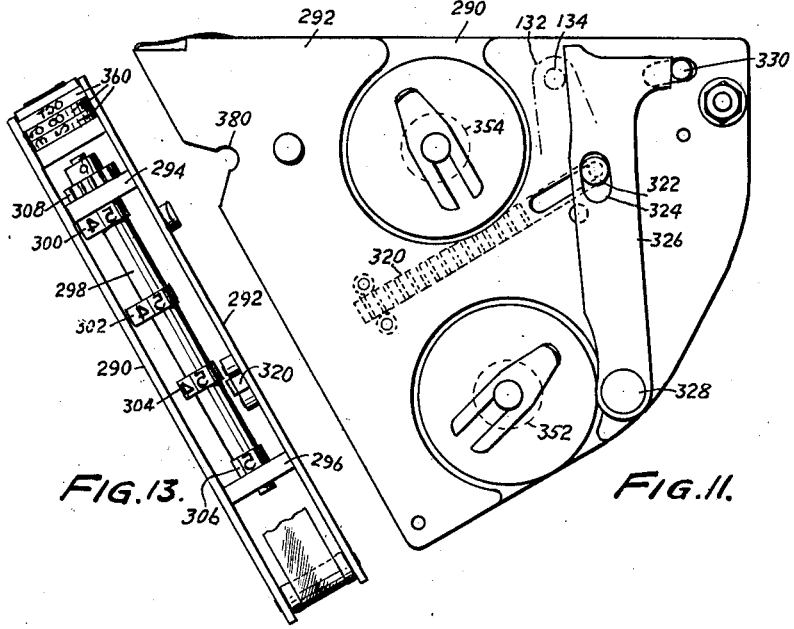
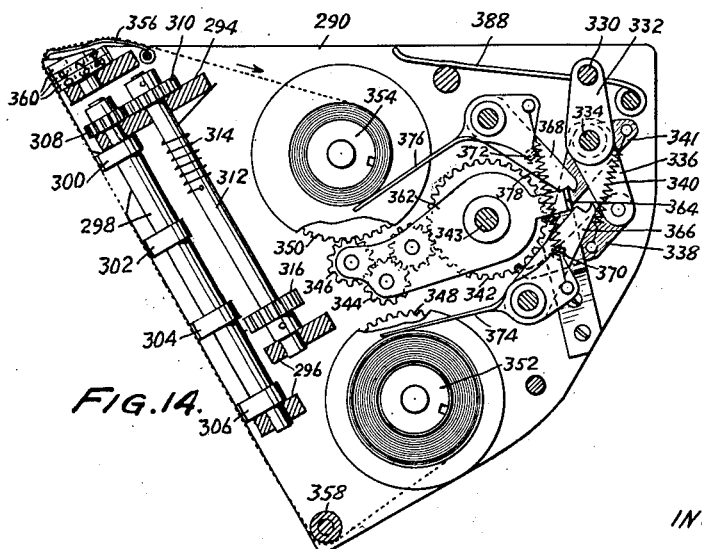
INVENTOR
Reuben H. Helsel
BY
ATTORNEYS.
WITNESS:

Patented July 27, 1943

2,325,054

UNITED STATES PATENT OFFICE 2,325,054

TICKET ISSUING MACHINE

Reuben H. Helsel, Long Island City, N. Y., assignor to General Register Corporation, New York, N. Y., a corporation of Pennsylvania Application January 7, 1941, Serial No. 373,437

13 Claims. (Cl. 164—49)

This invention relates to a ticket issuing machine, particularly adapted for the issuance of tickets for places of amusement.

It has been proposed for the purpose of providing a better check on the honesty of employees of theaters and the like, and to facilitate accounting, to identify each ticket issued as part of a group of tickets with the total number of tickets issued in the group. For example, if four tickets are issued simultaneously, each ticket, or, at any rate, each except the first ticket, should be marked with the number "4" or some equivalent identifying character. It has also been proposed that instead of issuing a group of rather readily separable tickets of the present type, there should be issued what is, in fact, one ticket, comprising, however, a number of sub-tickets or unit areas not readily separable from each other, the entire ticket being severable along a weakened or perforated line extending lengthwise of the ticket and transverse to the various sub-tickets.

It is one object of the present invention to provide a machine for issuing tickets of the general type just indicated, identifying them with numbers or other characters indicative of the total issued in a single cycle of operation. The invention, however, is not solely adapted for the issue of tickets of the type described above, but may be used for printing matters upon tickets of conventional type.

A further object of the invention is the provision of improved selecting means for the issue of one or more tickets or sub-tickets in a cycle of operation, depending upon depression of a selected key. This mechanism for determining the number of tickets or sub-tickets issued in a single cycle is interconnected with selective printing mechanism in accordance with a specific embodiment of the invention.

Still another object of the invention is the provision of an improved feeding and ticket strip adjusting means designed to insure that the ticket strip is properly positioned in relationship to severing means at the time severing occurs.

These and other objects of the invention relating to details of construction and operation will be apparent from the following description, read in conjunction with the accompanying drawings, in which:

Figure 2 is a vertical sectional view viewing the unit from the opposite side and showing particularly various elements located behind one of the side plates;

Figure 3 is a rear elevation of the unit with certain parts broken away to show details;

Figure 11 is a side elevation of a printing unit;

Figure 12 is a plan view of the printing unit;

Figure 13 is a face view of the printing unit looking toward the printing elements thereof;

Figure 14 is a vertical section through the printing unit;

Figure 15 is a perspective view of an adjustable printing element involved in said unit.

Figure 1:
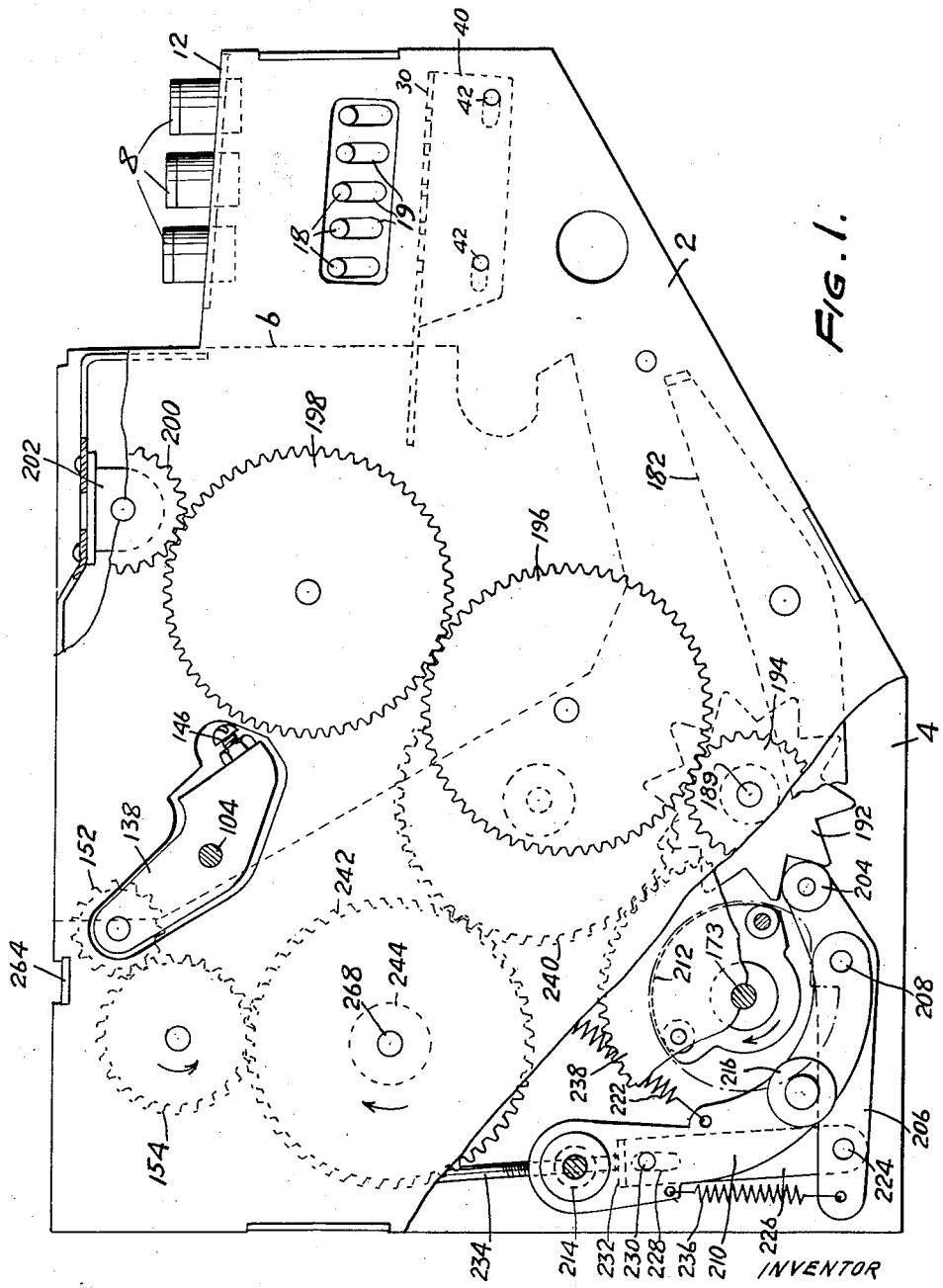
Figure 1 is a side elevation, partially broken away, of a ticket issuing unit embodying the improvements indicated above.
Figure 5:
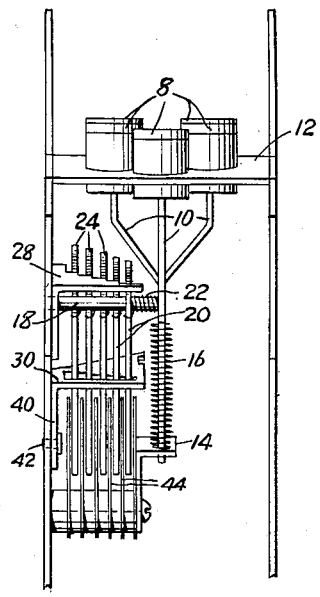
Figure 5 is a front elevation showing certain details of the key controlling mechanism.

A complete ticket issuing machine embodying the principles of the present invention comprises usually a plurality of separate units each adapted for the issue of tickets of a single denomination. These units are received in conventional fashion in a single casing and are adapted to be driven by a single motor connected to a countershaft provided with individual pinions for the various units into mesh with which pinions the driving gears of the various units move as they are placed in proper position within the casing. Since the case and countershaft arrangement form no part of the present invention, it need not be described herein. The arrangement may be of conventional type, as described, for example, in my Patent No. 2,097,485, dated November 2, 1937. The present inventions are embodied in each of the separate units and only one unit will be described in detail.

Each unit comprises a pair of side plates 2 and 4 and an intermediate plate 6 to serve as the principal supports for the various operating elements. Other bracket arrangements, cross-brackets, etc. are provided, as will be evident hereafter, but since they may take various convenient forms, they will not be described in detail.

The machine comprises a set of keys 8 which may, for example, and as disclosed, be five in number for the purpose of issuing one to five tickets, sub-tickets or unit areas, in a single operation. Each of the keys 8 is provided with a shank 10, the various shanks being shaped to bring their lower portions in substantially a single vertical plane extending lengthwise of the unit. The cylindrical portions of the keys slide in circular openings in a transverse top plate 12, and the lower ends of the shanks are guided in openings in a bracket 14.

Each of the shanks has extending laterally therefrom a pin 18 having limited movement within a corresponding vertical slot 19 in a bracket 28 secured to the side plate 2 of the unit. Mounted on each of the pins is a rocking lever 20, each being normally urged by an individual spring 22 in a counter-clockwise direction, as viewed in Figure 4. Each of the levers 20 is provided with a forwardly and upwardly projecting upper end 24 overlapping, in a vertical direction, a corresponding step 26 provided on the bracket 28. The levers 20 are arranged, as illustrated, in staggered relationship and have their lower ends extending between spacer plates 44 which serve to keep them separated and in proper lateral position.

The levers 20 extend downwardly through an opening in a locking plate 30 provided with a series of steps 32 adapted to engage shoulders 31 on the levers as described hereafter. The plate 30 is engageable by the lower end 34 of a rocking lever 36 pivoted at 38 and provided with a turned upper end 39 engageable by the operator to lock the machine. The plate 30 is mounted for forward and rearward movement by reason of the provision thereon of a downwardly directed flange 40 provided with slots embracing pins 42 carried by the side plate 2 of the machine.

The levers 20 are provided with downwardly facing shoulders or steps 46 and with sloping edges 47 normally engaging the steps 32 of the plate 30, under the action of springs 22.

Corresponding to each of the levers 20 there is a lever 48 having its forward end 50 projecting beneath the step 46 of its corresponding lever 20. These levers 48 project between the spacing plates 44 previously mentioned and are pivoted on a common rod 52 extending across the machine. The levers 48 have downwardly and rearwardly extending arms of equal length provided with notches 54 and sloping cam surfaces 56 adapted to cooperate with the turned ends 58 of a series of detent levers 60 of which there is one for each of the levers 48.

Mounted also upon the pin 52 is a yoke 62 having a flat portion underlying all of the levers 48 and adapted to be engaged by them. A spring 64 normally urges this yoke 62 in a clockwise direction, as viewed in Figure 2. The yoke is provided with an arm 66 engaged by an abutment portion 68 of a lever 70 pivoted on a pin 72 and provided with a nose 73 adapted to engage a switch-controlling plate 74 secured to a transverse pin 76 pivoted in the frame. Each of the plates 74 is provided with an ear 78 arranged to extend laterally of the unit and overlap the corresponding plate 74 of the next unit; or, in the case of the last unit, the ear 78 engages the motor-controlling switch. This arrangement is identical with that illustrated and described in my Patent No. 2,103,720, dated December 28, 1937. It is sufficient to mention herein that by reason of this interengagement of the switch controlling plates, the rocking of the yoke 62 in any unit by any of the keys thereof is effective to close the switch energizing the common driving motor.

To the upper end of the lever 70 is pivoted at 80 a link 82 urged forwardly by a strong spring 84 connected between it and a fixed portion of the frame. The connections of this link will be hereafter described.

The yoke 62 is provided with a depending arm 86 with which cooperates a forwardly extending arm 88 carried by a shaft 89 which also carries a depending lever 90 provided with a rounded end 92 engageable, under the action of spring 96, with the ticket supply strip S passing upwardly through the guide channel, indicated at 94, which guide channel is pivoted at its upper end at 95 so as to be movable for insertion of the ticket strip, as indicated hereafter. This guide channel is formed primarily of two spaced strips of metal between which the ticket stock passes.

The yoke 62 is also provided with a rearwardly extending arm 98, which is adapted to be acted upon at a suitable time in the cycle of the machine by a cam 100, which forms one of a group of cams carried by a hub secured to a gear 102 and rotatably mounted upon a fixed transverse pin 114.

Figure 4:
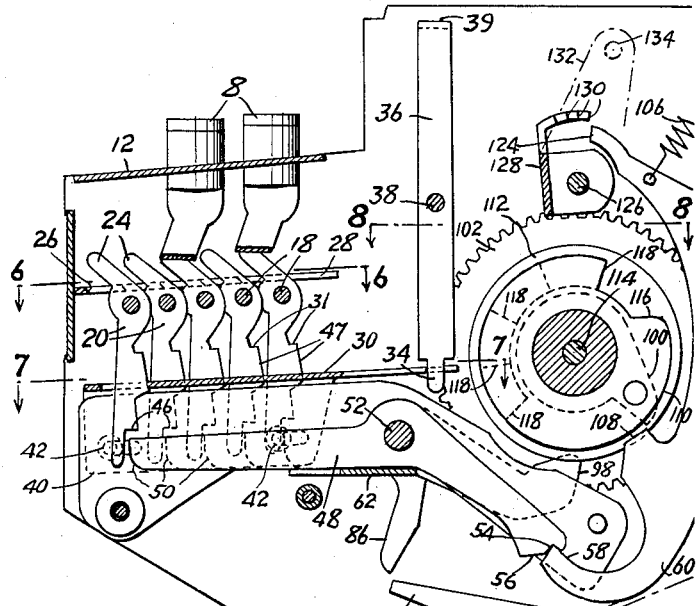
Figure 4 is a further fragmentary vertical section of the unit partially broken away in the lower right hand corner thereof to show a control means dependent upon the presence of supply strip.
Figure 6:
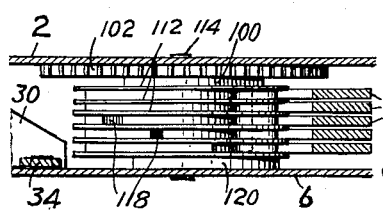
Fig. 6 is a fragmentary horizontal section taken on a plane the trace of which is indicated at 6—6 in Figure 4.
Figures 7, 8:
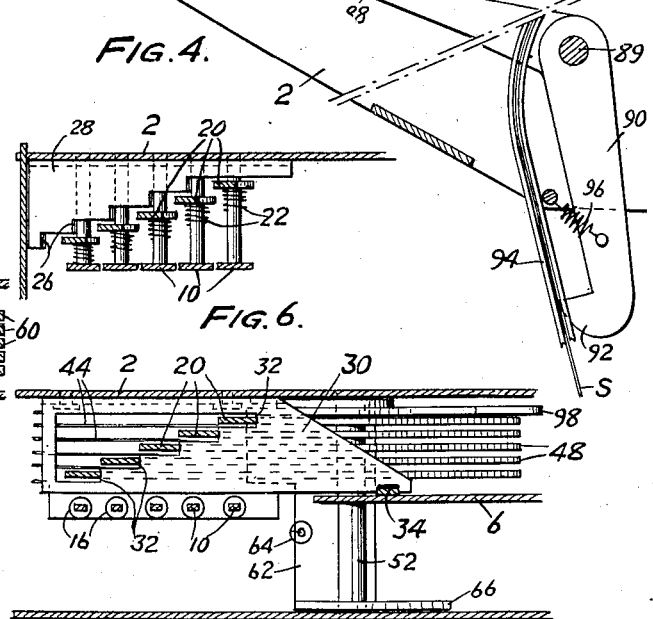
Figure 7 is a similar section taken on a plane the trace of which is indicated at 7—7 in Figure 4.
Figure 8 is a horizontal section illustrating in particular a group of cams determining the period of operation of the machine.
Figure 9:
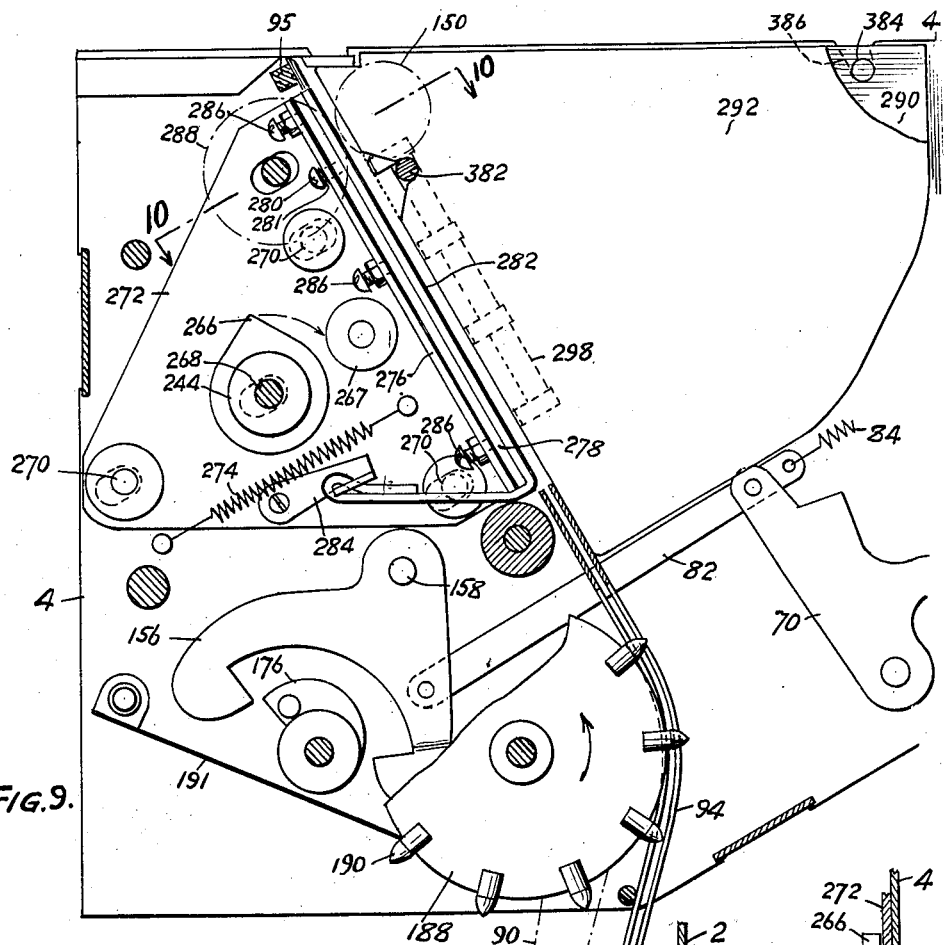
Figure 9 is a fragmentary vertical section showing in particular details of a platen mechanism and the manner in which a printing unit is associated with it.

The various levers 60 previously mentioned are pivoted on a common transverse pin 104 and urged in a counter-clockwise direction as viewed in Figures 2 and 4 by means of individual springs 106 connected between them and fixed portion of the frame. Each of the levers 60 is provided with a cam follower portion 108 which is normally spaced from an individual corresponding cam 110. There is a cam 110 corresponding to each of the levers 60, and all of these cams have rises 116 located in the same angular position relative to the gear 102. However, these cams terminate at different positions, indicated at 118, the cam corresponding to the issue of one ticket having the greatest angular extent, the cam corresponding to the issue of two tickets having less angular extent, and so on, up to the cam controlling the issue of five tickets, which has the least extent. These various cams are spaced by discs 112 between which the follower portions 108 of the various levers project so as to be properly positioned for cooperation with their respective cams.

The hub of the group of cams just referred to also carries a cam 120, as illustrated in Figure 2, provided with a drop 122.

On a transverse pin 126 is mounted a yoke 128 provided with four steps, illustrated at 130, arranged to engage the ends 124 of the levers 60, which are operated in the issuing of two to five tickets. There is no step provided corresponding to the lever 60 which operates in the issuing of a single ticket, its end 124 being inoperative. The yoke 128 is provided with a bell crank, one end of which, 132, carries a pin, 134, projecting laterally through the plate 6 for the purpose hereafter described. The other arm, 136 of the bell crank follows the cam 120, under the action of a spring urged member 326 engaging the pin 134.

On the pin 104, providing the pivot for the levers 60 is journalled a yoke member 142 embracing the group of levers and provided with a plate 144, engageable by the levers under the adjustment afforded by a pair of screws 146, the plate being loosely held inside the transverse portion of the yoke by means of a screw 143 threaded into the plate and passing loosely through an opening in the yoke and pressed outwardly by a compression spring 145. The yoke 142 is provided with an upwardly extending arm 138 urged in a counter-clockwise direction, as viewed in Figure 2, by a weak spring 140 and supporting, on a pivot pin 148, a knurled feed roller or disc 150 to which is secured a pinion 152 meshing with a gear 154, to which is secured a cooperating knurled feed roller or disc 288 journalled on a fixed pin 229. The rollers 150 and 288 are arranged to pinch and feed the ticket strip passing upwardly through the guide 94, and for this purpose extend into slots in the plates forming the guide 94.

Returning to the connections of the link 82, that link is pivoted to a double-armed lever 156, which is mounted on a stud 158. One arm of this lever is formed as a hook 160 adapted to be engaged by a pin 162 carried by a gear segment 164 pivoted at 166 to a gear 172 and urged outwardly by a spring 168 toward a position which, in operation, is limited by a pin 170 projecting from the gear 172 through an enlarged opening in the segment 164. The gear 172 is cut away for a portion thereof, which is adapted to be bridged by the segment 164. In its inner position, this segment permits a gap in the continuity of the teeth, and consequently the teeth are out of mesh with the individual pinion 165 for the unit carried by the common counter shaft 167 for the several units. On the other hand, when the segment 164 is released, its teeth provide a continuous set with the teeth of gear 172, and meshing and proper drive will result. This clutching arrangement is not new in this particular machine, and its function and operation are the same as in my prior Patent 2,219,650, dated October 29, 1940.

Secured to the shaft 173 of the gear 172 is a cam 176 which, by engagement with the other arm 174 of the lever 156 serves to restore it to the position shown following its displacement in the cycle of operation. Also secured to shaft 173 and rotating with the gear 172 is a cam 178 provided with a notch 180 behind which there engages the rear end of a lever 182 pivoted at 183 to the frame and urged by a spring 184 in a counterclockwise direction, as viewed in Figure 2. The lever 182 has a turned forward end 186, which, in the stationary position of the machine, underlies the rear end of the switch controlling plate 74. As will be pointed out hereafter, this lever serves to maintain the switch closed until the cycle is completed.

A pinwheel 188, provided with pins 190, is carried by a shaft 189 journalled in the frame of the machine, in such fashion as to project the pins 190 through a slot in the ticket guide 94 and into engagement with the openings in the ticket strip feeding through the guide. The purpose of the movement of the guide 94 about its pivot 95 previously referred to is to permit the guide to be moved away from the pins so that they will not obstruct the feeding of the ticket strip through the guide in the initial threading of the machine. A spring 222 normally urges the guide into the position illustrated in Figure 2. This spring 222 serves also to apply tension to another member, hereafter referred to.

A blade 191 urged by a spring 193 toward the pinwheel 188 serves by engagement behind the pins 190 to prevent any retrograde movement of the pinwheel. It yields readily to permit free forward movement of the pinwheel.

Secured to the shaft 189 of the pinwheel 188 is a star wheel 192 having V-shaped notches therein corresponding in number to the pins 190. Secured also to the pinwheel shaft 189 to rotate with it is a pinion 194 which, through intermediate gears 196 and 198 drives the pinion 200 of the counter 202. As will be pointed out hereafter, the pinwheel does not serve to drive the ticket strip, but is rotated by the feed of the ticket strip. Accordingly, the counter serves only to count the actual tickets issued by the machine. An operation in the absence of the ticket strip at the position of the pinwheel 188, even if it occurred due to a failure of the lever 90 to effect its control, would not result in registration by the counter.

Adapted to engage within the notches of the star wheel 192 is a roller 204 carried at the forward end of a lever 206 pivoted at 208 to a lever 210, which is mounted on a transverse pin 214 and is provided with a roller 216 arranged to be acted upon by a cam 212 secured to shaft 173 and rotating with the gear 172. The spring 222 heretofore referred to serves to urge the roller 216 toward the cam 212.

To the link 206 is pivoted at 224 another link 226 provided with a slot 228 embracing a pin 230 carried by lever 210. The link 226 has a turned upper end 232 abutting, under the action of the spring 236, the lower end of a screw 234 threaded through the pin 214 and having its upper end extending to the top of the unit so as to be readily adjustable. As will be evident from Figure 1, the adjustment of the abutment screw 234 serves for the accurate positioning of the roller 204, in effect approximately about pin 208, and hence for the accurate angular positioning of the star wheel 192. This adjustment is important to insure that the proper portion of the ticket strip is presented to the severing knife at the time cutting takes place.

Rotating also with the gear 172 is the gear 238 carried by shaft 173, which drives gear 240 and through it a gear 242 provided with a hub 244. This last gear 242 drives the pinion 154, to which is secured the feed roller 288.

To the hub 244 of gear 242 is secured a disc 246 carrying on opposite faces thereof rollers 248 and 250, respectively, adapted to act upon the arms 252 and 254 of the knife operating lever 256 pivoted upon a transverse pin 258 and engaging at its upper end the movable knife 260. This knife 260 is urged downwardly by a spring 262 reacting between it and the lever 256 into proper engagement with the fixed blade 264 to effect proper cutting of the ticket strip fed through the guide 94.

The hub 244 of the gear 242, which is journalled upon a fixed pin 268, carries a cam 266 adapted to engage a follower roller 267 carried by a plate 272, which is provided with guiding slots embracing pins 270, so that it may be moved by the action of cam 266 against the tension of spring 274 in an upward and forward direction transverse to the direction of extent of the upper portion of the guide 94. The plate 272 is provided with an outwardly turned flange 276, extending parallel to the guide 94, outside of which flange there is a plate 278 loosely mounted on the flange 276 by means of a screw 280 threaded into the plate 278 and loosely passing through an opening in the flange. A spring 281 surrounding the screw serves to urge the plate 278 rearwardly to a position determined by a plurality of set screws 286, which serve as limiting stops. To the face of the plate 278 there is secured a platen material of leather or the like 282 having its end anchored in an arm 284 fixed to the plate 272. As will be pointed out hereafter, printing on the ticket strip is effected by the action of cam 266 in forcing the backing platen material 282 against the ticket strip to press it in turn against an inked ribbon backed by type.

Printing is effected through the medium of a unit illustrated in detail in Figures 11 to 15. This unit comprises side plates 290 and 292 serving as supports for the various operating parts of the unit. In cross-brackets 294 and 296 there is mounted a type carrying member or spindle 298, which, as illustrated in Figure 15, contains spaced type groups or bands 300, 302, 304 and 306. All four of these carry the numeral "5" in axial alignment. The groups 300, 302 and 304 carry the numeral "4" in axial alignment. The groups 300 and 302 carry the numeral "3" in axial alignment, and the group 300 additionally includes the numeral "2." The member 298 is provided at its upper end with a pinion 308 meshing with a pinion 310 carried by a shaft 312 mounted parallel to the member 298. A spring 314 normally urges the shaft 312 in a direction to cause the member 298 to move beyond the position corresponding to the numeral "2" in printing position.

A pinion 316 secured to the lower portion of the shaft 312 is in mesh with a rack 320, suitably guided along the side plate 292 and provided at its upper end with a pin 322 projecting into a slot 324 in a lever 326 pivoted at 328 to the plate 292. This lever 326 is the one previously referred to and illustrated in Figure 2 as engaging pin 134 of the lever 132. When the machine is in the rest position, the engagement of the lever 326 with pin 134 results in pulling the rack 320 in opposition to the spring 314 to cause the type faces numbered "5" to be approximately in printing position. Actually, their position is slightly beyond the printing position, so that a slight movement under the action of spring 314 causes them to reach proper printing position.

The upper end of the lever 326 engages a pin 330 carried by the upper end of an arm 332 secured to a shaft 334, pivoted in the plates 290 and 292. The shaft 334 carries a depending arm 336 to which is pivoted a pawl 338 urged into engagement with a ratchet wheel 342 by means of a spring 340 reacting between the pawl and a detent 341, also engaging the teeth of the ratchet 342 and pivoted freely on the shaft 334. The ratchet 342 is journalled upon a pin 343, on which there is also journalled a frame 362 provided with pins carrying lower and upper pinions 344 and 346, which mesh with each other and through an intermediate pinion with the ratchet wheel 342. The pinion 344 is adapted at proper times to mesh with a gear 348 while the pinion 346 is adapted to mesh with a gear 350. These gears respectively carry the inked ribbon carriers 352 and 354, which support conventional spools of typewriter ribbon passing over a spring member 356 to maintain tension and about a guide roller 358 across the faces of the type elements carried by member 298. Additionally, they extend across the type elements on slugs 360 which may, for example, carry dating characters or other information such, for example, as the name of a theater or the like.

The frame 362 has a tail portion 364 projecting laterally and adapted to be alternately engaged by the notched ends of levers 366 and 368 journalled on fixed pins. Within openings in these levers there project the turned ends 370 and 372 of pivoted feeler blades 374 and 376 bearing upon the reels of inked ribbon.

The mechanism last referred to is for the purpose of feeding the ribbon and reversing the direction of feed at proper times. The feeding is accomplished by the action of pawl 338, retrograde movement being prevented by the detent 341, the feeding taking place whenever the lever 326 moves rearwardly in an issuing operation. The feelers 374 and 376 serve in a fashion which will be obvious to shift the frame 362 to cause either pinion 344 or pinion 346 to drive the inked ribbon.

The printing unit is made readily removable and replaceable in the machine. This end is accomplished by providing it with a notch 380 engageable with a pin 382 in the machine frame and by providing it additionally with a pin 384 engageable in a notch 386 in the machine frame. The latter notch is so arranged as to take the force of printing applied by the platen 282 without disturbing the printing unit. To facilitate removal of the unit, it may be provided with a member 388 pivoted on a transverse pin and liftable by the finger of an operator to serve as a handle for removing the unit.

Figure 16:
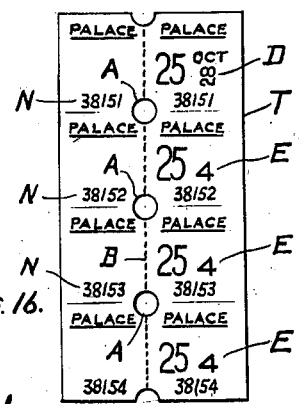
Figure 16 is an elevation of a ticket adapted to be issued by the improved machine.
Figure 10:
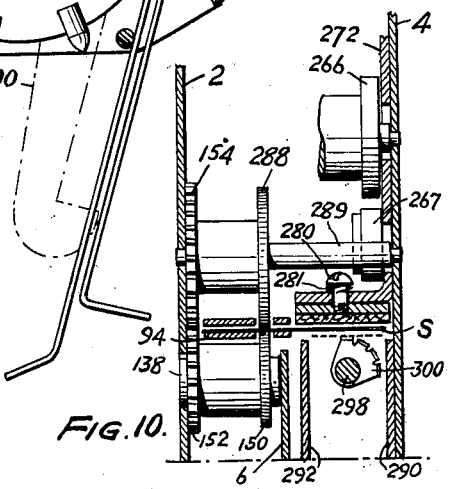
Figure 10 is a fragmentary section taken on the plane the trace of which is indicated at 10—10 in Figure 9.

The type of ticket to be issued by the unit is illustrated in Figure 16, at T. The strip S fed into the machine is provided with central openings illustrated in the ticket at A and provided down its center line with perforations, indicated at B. The ticket strip is not provided with the usual transverse weakened or perforated lines, but is, in fact, preferably of stock which cannot be readily torn along a well defined transverse line. The strip is preprinted, for example, with the name of the theater, the price and with serial numbers, indicated at N. Each ticket issued may comprise one to five sub-tickets. For example, in Figure 16 the ticket T comprises four sub-tickets on the uppermost one of which the machine prints the date indicated at D and on each of the next three the number "4" indicated at E. The ticket is designed to be used in carrying out a checking and accounting system, which need not be described herein. It will suffice to state that the ticket issued by the machine is presented to the ticket taker, who will tear it lengthwise along the line of perforations B, presenting the left hand portion, as illustrated in Figure 16, to the customer and depositing the right hand portion containing the date D and the members E in the usual receptacle. If the ticket contains but a single sub-ticket, that will have the date printed thereon. On the other hand, if the ticket contains more than one sub-ticket, the whole number of sub-tickets will be printed on each sub-ticket subsequent to the first. Examination of the stubs and their use in special fashions serves as a check on various factors and facilitates accounting. The present invention is not concerned with the form of ticket, but solely with the fashion in which the ticket of this type is produced and issued.

The operation of the improved mechanism may now be described. In all of the figures of the drawings, the parts are shown in their initial rest positions, immediately prior to the initiation of a ticket printing and issuing operation. As was explained heretofore, the complete ticket machine will generally comprise a series of units such as that illustrated, and in such case the ears 73 of the plates 74 of the successive units will overlap, the last of these serving to control the closing of a master switch which will energize the common driving motor for the entire set of units. As also explained above, beneath the gear 172 of each of the units is a pinion 165 carried by a common transverse shaft 167. Initially, however, the pinions do not mesh with anything, because the segments 164 of all of the units are withdrawn upwardly out of meshing position.

It will be evident from the operations hereafter described that two or more units of the machine may be simultaneously operating without interference with each other.

The locking lever 36 will be in the position illustrated in Figure 4 to maintain the plate 30 in its rearmost position, so that the key control elements will be operative. The ticket strip S will be located in the unit, holding outwardly the lever 90, and accordingly removing the arresting arm 88 from an interfering position with respect to the depending arm 86. The ticket strip will be located with its upper end, which will pass through one of the openings A, directly at the position of meeting of the knife blades 260 and 264.

The operation of the machine is initiated by depression of any one of the keys 8. It will be assumed that there is depressed the key which will effect the issue of four sub-tickets, i. e., of the ticket of Figure 16.

As the key moves downwardly, it will carry with it through the medium of its pin 18 a lever 20, which will, in turn, engage the free end 50 of the corresponding lever 48, moving slightly rearwardly to effect this result as the sloping edge 47 moves down the corresponding step of the plate 30. As the lever 48 rocks, its notch 54 will release the corresponding lever 60, the cam follower portion 108 of which will drop against the surface of its corresponding cam 110. At the same time, its end 124 will move slightly upwardly into the path of the corresponding step 130 of the yoke 128. As the lever 48 rocks, it will also rock the yoke 62, causing detent 66 to release lever 70, which is urged in a counterclockwise direction by the strong spring 84. As the lever 70 rocks, its end 73 depresses plate 74, thereby, directly or through intermediate units, closing the motor energizing switch of the machine. At the same time, through link 82 the member 156 is rocked releasing the pin 162 on the segment 164 to permit it to drop into mesh with the pinion 165 directly beneath it. All of the parts are thereby set up for the beginning of the issuing operation.

As the rotation of the gear 172 begins, the rise of the cam 178 will rock the lever 182 against the tension of spring 184 to engage the tail of the plate 74, thereby effecting the holding down of this plate in addition to that resulting from the lever 70. As will be evident hereafter, this action of lever 182 serves to maintain the switch closed and the driving motor energized until the end of the cycle of operation, despite the fact that the lever 70 must be restored to its initial position well prior to the end of the cycle.

Through the train of gearing the feed disc 238 will immediately start to rotate. However, it cannot feed the ticket strip because, at this time, the movement of the lever 60 will not have been sufficient to press the feed disc 160 against the ticket strip to pinch it for the feeding operation.

In the very early part of the operation, the roller 250 on the disc 246 will engage the arm 254 of the knife controlling lever 256 to withdraw the movable blade from the end of the ticket guide, so that when feeding takes place, the ticket strip may move freely outwardly.

Very shortly after the beginning of the cycle, the cam 122 will clear the arm 136 so that the yoke 128 may rock in a clockwise direction as viewed in Figure 4. The movement of the yoke under the action of the spring 314 of the printing unit will take place to the extent determined by engagement of one of its steps with the end 124 of the lever 60, which has been rocked. As a result, the arm 326 of the printing unit, which is connected to the rack 320, is permitted to move some predetermined distance which will, in the present case, be sufficient to move the three "4's" of the member 298 into printing position behind the inked ribbon. As this movement takes place, the pin 330 will be released by arm 326 serving accordingly to rock shaft 334 to retract pawl 338. Later in the cycle of operation this action is reversed; and consequently the pawl 338 will impart a step to the inked ribbon to advance it. The advancing steps, as will be evident, will be of different lengths, depending on the number of subtickets issued; but since all that is required is movement of the ribbon, the extent in each operation being immaterial, no fine adjustments of this mechanism for length of feed are necessary.

The printing member 298 having been set up, as just described, the printing action may occur. This is effected by the action of cam 266 on follower roller 267 to press the platen 262 against the ticket strip forcing it against the inked ribbon backed up by the ticket including, of course, the dating or other slugs indicated at 360. Accordingly, in the present instance, the portion of the ticket strip which will form the first sub-ticket is impressed with the date, while the next three sub-tickets will be impressed with the number "4." As will be evident from the shape of the cam 266, the platen is substantially immediately released under the action of the spring 274. Feeding of the ticket strip may accordingly commence.

Feeding begins when the follower portion 108 of the actuated lever 60 drops off the end of its corresponding cam 110. In the present instance, in the issue of four sub-tickets, the cam with which the actuated lever 60 will be engaged will be the second in order of increasing length. When such dropping off of the follower portion 108 occurs, the lever 60 will move sufficiently under the action of its strong spring 166 to rock the feed disc 160 into tight pinching engagement with the ticket against the action of its weaker retracting spring 140. The ticket strip will, therefore, begin its movement.

Just prior to this event, the cam 212 will have engaged roller 216 on lever 210, thereby effecting the retraction of roller 204 from the notch of the star wheel 192. As a result, the pinwheel 188 is free to move with the ticket strip and will, in turn, rotate the gear 230 of the counter 232 to cause it to record the number of sub-tickets issued.

The feed of the ticket strip continues until the follower 108 of the actuated lever 60 rides up the rise 116 of its cam 110, thereby releasing the disc 150 from its engagement with the strip. The total feeding movement imparted to the ticket strip is desirably slightly in excess of the amount necessary to bring the proper cutting line in alignment with the knives. As soon as the feeding action ends, the roller 216 is released by the cam 212 to permit the roller 204 to drop into the notch of the star wheel 192, then presented to it. It will be evident that a camming action of the roller on the teeth of the star wheel can occur, and this serves to move slightly in a forward or rearward direction the star wheel so as to adjust the ticket strip to align a proper portion thereof, preferably one of the openings A, with the knives. The blade 191 does not interfere with this action, being suitably located with respect to the pins. Its function is solely to prevent retrograde rotation of the pinwheel which might result in the ticket strip's dropping out of the guide after the star wheel is released by the roller 204.

It will be evident that the adjustment afforded by the screw 234 thus insures accurate alignment of the ticket strip with the knives. Slight non-uniformities of manufacture make it desirable to provide this adjustment, though when once set no further adjustment is generally necessary. The adjustment is of course, essentially that of the lever 206 about the pivot 208.

By the above operations the ticket strip will have been brought into position for cutting. The cutting action is effected by engagement of the roller 248 with the arm 252 of the knife lever 256. The ticket is thereby delivered to the patron through the usual slot in the top plate of the machine.

In the meanwhile, the parts which have been displaced are being brought back to their initial positions. Arm 136 of the yoke 128 will be rocked by cam 120 to effect the restoration of the yoke and with it of the lever 326 and the printing element 298, which will be returned slightly beyond the printing position for the "5's." The feeding of the inked ribbon takes place in this action. Near the end of the cycle of operation, the cam 100 will engage the arm 98 of the yoke 62. Accordingly, the lever 43, which was rocked, will be forcibly moved to its original position, the cam 56 acting upon the end 58 of the displaced lever 60 to move it outwardly to a position to engage within the notch 54. As the yoke 62 rocks, the portion 66 will move in front of the edge 68 of the lever 70, which, just prior to this time, will have been rocked rearwardly by the action of cam 176 on the upper arm of the double-armed lever 156. While this motion of the lever 70 will release the switch controlling plate 74, the switch will remain closed due to the action of the lever 182.

The positioning of 156 by cam 176 results in bringing the hook 160 into the path of pin 162 of the segment 164 where it remains when cam 176 clears arm 174 because of engagement of 70 with detent 69. As the pin 162 is thus arrested, the segment 164 is released from mesh with the driving pinion, and accordingly the operating parts of the unit stop. Just as the gear 172 reaches its final position, the lever 182 drops off the cam 178, thereby releasing the switch plate 74 to permit the switch to open.

The restoration of the keys may have taken place by their release immediately after the operation of the machine began. However, even if they were continuously held down, the machine would not operate through another cycle. This result is due to the fact that immediately after the levers 20 are lowered sufficiently to initiate action of the machine by releasing lever 70 and one of the levers 60, their upper ends 24 will engage steps 26, swinging them forwardly to disengage their shoulders 46 from lever ends 50. Accordingly, further and quite unavoidable depression of any one of the keys will result in the swinging of the shoulder 45 into such position as not to be engageable by a lever 48 when the latter is restored to its initial position. Subsequent operation of the machine cannot, therefore, occur until the key is released and subsequently depressed.

In the event of simultaneous depression of two keys, it will be evident that a ticket will be issued corresponding to the key of maximum value that is depressed. In the case of such accidental operation, the proper numbering will, nevertheless, take place, since the printing element 298 is released from a position corresponding approximately to the printing of the highest number. Thus there is insured a proper numbering of every sub-ticket of the strip, irrespective of intentional or unintentional faulty operation by the operator.

Locking of the machine is simply effected by the use of the lever 36, which is so rocked as to move the plate 30 forwardly. By this action, the steps of the plate are caused to rock the levers 20 to such position that upon their depression they will fail to engage the levers 48. If after such locking any key is depressed, the result will be the latching down of such depressed key by engagement of its shoulder 31 beneath the corresponding step 32 of plate 30. This is desirable not only to indicate that the machine is in locked condition, but to prevent tampering with the keys.

In the event the ticket strip runs out, the unit is immediately locked by the movement of arm 88 into the path of the arm 86 of the yoke 62. The lever 92 engages the ticket strip sufficiently below the knives to insure that there is always sufficient present to permit the issue of the maximum number of tickets.

In the issue of a ticket containing any different number of sub-tickets, the action is essentially the same. In case only one sub-tickets is issued, however, the yoke 128 is not arrested by any of the levers 124, and accordingly may move until the pin 134 strikes the end of the slot through which it passes in the plate 6. This movement is sufficient to cause the printing element 298 to move beyond the printing position of the "2." Accordingly, the sole printing that takes place is that due to the slugs 360.

What I claim and desire to protect by Letters Patent is:

1. A ticket issuing machine comprising means for guiding a ticket strip having openings therein, means for clamping the ticket strip and movable to advance it along said guiding means, means for effecting engagement and release of the ticket strip by said clamping means, means comprising a fixed knife and a movable knife for severing the ticket strip, and means for aligning the ticket strip with respect to said severing means, the aligning means comprising an element continuously engaging the openings in the ticket strip, means forcibly holding said engaging element in predetermined positions relative to the direction of movement of the ticket strip, and means releasing said element from restraint by the last mentioned means when the clamping means advances the ticket strip.

2. A ticket issuing machine comprising means for guiding a ticket strip having openings therein, means for clamping the ticket strip and movable to advance it along said guiding means, means for effecting engagement and release of the ticket strip by said clamping means, means comprising a fixed knife and a movable knife for severing the ticket strip, and means for aligning the ticket strip with respect to said severing means, the aligning means comprising an element engaging the openings in the ticket strip, adjustable means forcibly holding said engaging element in predetermined adjusted positions, and means releasing said element from restraint by the last mentioned means when the clamping means advances the ticket strip.

3. A ticket issuing machine comprising means for guiding a ticket strip having openings therein, means for clamping the ticket strip and movable to advance it along said guiding means, means for effecting engagement and release of the ticket strip by said clamping means, means comprising a fixed knife and a movable knife for severing the ticket strip, and means for aligning the ticket strip with respect to said severing means, the aligning means comprising a pinwheel engaging the openings in the ticket strip, a notched member moving with said pinwheel, and a holding element engageable in the notches of said member and adjustable in a direction having a component about the axis of the notched member so that the pinwheel may be angularly adjusted thereby to effect adjustment of the strip.

4. A ticket issuing machine comprising means for guiding a ticket strip, means for feeding the ticket strip variable distances along said guiding means, and means controlling said feeding means to determine the extent of feed, said feeding means comprising a strip-engaging rotating member having during every cycle of operation of the machine a movement at least that required for the maximum extent of ticket feed, a second rotating member arranged to clamp the ticket strip against the first mentioned rotating member, and devices affected by said controlling means to move said members relatively to each other into clamping engagement with the ticket strip for predetermined portions of the cycle of operation.

5. A ticket issuing machine comprising means for guiding a ticket strip, means for feeding the ticket strip variable distances along said guiding means, and means controlling said feeding means to determine the extent of feed, said feeding means comprising a strip-engaging rotating member having during every cycle of operation of the machine a movement at least that required for the maximum extent of ticket feed, a second rotating member arranged to clamp the ticket strip against the first mentioned rotating member, and devices affected by said controlling means to move said members relatively to each other into clamping engagement with the ticket strip for predetermined portions of the cycle of operation, said clamping engagement being maintained continuously throughout the entire strip-feeding period in every cycle of operation.

6. A ticket issuing machine comprising means for guiding a ticket strip, means for feeding the ticket strip variable distances along said guiding means, and means controlling said feeding means to determine the extent of feed, said feeding means comprising a strip-engaging rotating member having during every cycle of operation of the machine a movement at least that required for the maximum extent of ticket feed, a second rotating member arranged to clamp the ticket strip against the first mentioned rotating member, a plurality of elements each of which is operative independently of the others to maintain said rotating members in clamping relationship with the strip, and means for causing said elements to effect their respective maintaining actions for different portions of the cycles of operation.

7. A ticket issuing machine comprising means for guiding a ticket strip, means for feeding the ticket strip variable distances along said guiding means, and means controlling said feeding means to determine the extent of feed, said feeding means comprising a strip-engaging rotating member having during every cycle of operation of the machine a movement at least that required for the maximum extent of ticket feed, a second rotating member arranged to clamp the ticket strip against the first mentioned rotating member, a plurality of elements each of which is operative independently of the others to maintain said rotating members in clamping relationship with the strip, and means for causing said elements to effect their respective maintaining actions for different portions of the cycles of operation, said controlling means rendering said elements selectively operable.

8. A ticket issuing machine comprising means for guiding a ticket strip, means for feeding the ticket strip variable distances along said guiding means, and means controlling said feeding means to determine the extent of feed, the last mentioned means comprising a plurality of manually actuable elements, members individual to, and engageable and movable by, said elements upon their movements under manual actuation, and means for disengaging said elements from their respective members upon continued movement of the elements after their members reach operative positions so that reengagement may be established only after manual release of said elements.

9. A ticket issuing machine comprising means for guiding a ticket strip, means for feeding the ticket strip along said guiding means, and means for effecting operation of said feeding means, the last mentioned means comprising a manually actuable element, a member engageable and movable by said element upon its movement under manual actuation, and means for disengaging the element from said member upon continued movement of the element after said member reaches operative position so that reengagement may be established only after manual release of the element.

10. A ticket issuing machine comprising means for guiding a ticket strip, means for feeding the ticket strip variable distances along said guiding means, and means controlling said feeding means to determine the extent of feed, said feeding means comprising a strip-engaging rotating member having during every cycle of operation of the machine a movement at least that required for the maximum extent of ticket feed, a second rotating member arranged to clamp the ticket strip against the first mentioned rotating member, devices affected by said controlling means to move said members relatively to each other into clamping engagement with the ticket strip for predetermined portions of the cycle of operation, and means for engaging the ticket strip to adjust its position following its feed by the rotating members.

11. A ticket issuing machine comprising means for guiding a ticket strip, means for feeding the ticket strip variable distances along said guiding means, and means controlling said feeding means to determine the extent of feed, said feeding means comprising a member for frictionally engaging the strip to move the same, and devices affected by said controlling means to cause said member to engage and feed the strip for predetermined variable portions of the cycle of operation thereby to determine the number of tickets issued, said engagement of the member with the strip being maintained continuously throughout the entire strip-feeding period in every cycle of operation.

12. A ticket issuing machine comprising means for guiding a ticket strip, means for feeding the ticket strip variable distances along said guiding means, and means controlling said feeding means to determine the extent of feed, said feeding means comprising a member for frictionally engaging the strip to move the same, a plurality of elements each of which is operative independently of the others to maintain said engagement of the member with the strip, and means for causing said elements to effect their respective maintaining actions for different portions of the cycles of operation, said controlling means rendering said elements selectively operable.

13. A ticket issuing machine comprising means for guiding a ticket strip, means for feeding the ticket strip variable distances along said guiding means, and means controlling said feeding means to determine the extent of feed, said feeding means comprising a member for frictionally engaging the strip to move the same, and devices affected by said controlling means to cause said member to move into operative engagement with and feed the strip for predetermined variable portions of the cycle of operation thereby to determine the number of tickets issued.

REUBEN H. HELSEL.